(12) United States Patent
Hardy

(10) Patent No.: US 7,688,468 B2
(45) Date of Patent: Mar. 30, 2010

(54) METHOD OF ILLUMINANT ADAPTATION

(75) Inventor: Stephen James Hardy, West Pymble (AU)

(73) Assignee: Canon Kabushiki Kaisha, Tokyo (JP)

( * ) Notice: Subject to any disclaimer, the term of this patent is extended or adjusted under 35 U.S.C. 154(b) by 1269 days.

(21) Appl. No.: 11/178,299

(22) Filed: Jul. 12, 2005

(65) Prior Publication Data

US 2006/0007458 A1    Jan. 12, 2006

(30) Foreign Application Priority Data

Jul. 12, 2004    (AU) ............................... 2004903822

(51) Int. Cl.
- G06F 15/00    (2006.01)
- G06K 1/00    (2006.01)
- H04N 1/60    (2006.01)
- G06K 15/00    (2006.01)
- H04N 1/40    (2006.01)

(52) U.S. Cl. ...................... 358/1.9; 358/3.04
(58) Field of Classification Search ............... 358/1.9, 358/516, 3.04–3.1; 348/370, 582; 382/167
See application file for complete search history.

(56) References Cited

U.S. PATENT DOCUMENTS 6,320,980 B1    11/2001    Hidaka .................. 382/167

OTHER PUBLICATIONS

Brian Funt et al., "Chromatic Adaption Transforms With Tuned Sharpening", *Proc. First European Conference on Color in Graphics, Imaging and Vision*, France, pp. 148-152, Poitiers, Apr. 2002, pp. 1-4.

Brian Funt et al., "Non-von-Kries 3-Parameter Color Prediction", *Proc. of SPIE* vol. 5007, *Electronic Imaging Conference, Human Vision and Electronic Imaging VII*, Santa Clara, Jan. 2003, pp. 1-8.

*Primary Examiner*—Douglas Q Tran
(74) *Attorney, Agent, or Firm*—Fitzpatrick, Cella, Harper & Scinto

(57) ABSTRACT

A method (300) is disclosed of performing chromatic adaptation. The method (300) predicts final colour data viewed under a final illuminant from initial colour data viewed under a initial illuminant. The method (300) receives (310) the initial and final illuminant spectra and spectral sensitivity functions of the colors between which chromatic adaptation is to be performed. A linear chromatic adaptation transform is then determined (320) for transforming the initial color data to the final color data. The linear chromatic adaptation transform is determined (320) by minimising the residual error between color data predicted using the chromatic adaptation transform and the final color data. Different spectral bands of the illuminant spectra and the spectral sensitivity functions are weighted based on the contribution made by each spectral band to a predefined function. The method (300) then applies (330) the linear chromatic adaptation transform to the initial color data.

6 Claims, 8 Drawing Sheets

METHOD OF ILLUMINANT ADAPTATION

FIELD OF THE INVENTION

The present invention relates generally to color correction of images and, in particular, to the chromatic adaptation of colors to account for different illuminants.

BACKGROUND

The human visual system has a remarkable ability to adapt to the ambient illumination in such a way that colors appear the same under different illumination conditions, even when physical measurements show that the spectrum of the light being received by the eye is quite different due to the different illumination conditions. For example, the leaves of a tree will be perceived largely as a particular shade of green regardless of whether the leaves are viewed in bright sunlight, the light from an overcast daylight, or in the reddish light of a sunset.

This ability of the human visual system poses a problem for artificial systems such as cameras, scanners or printers that wish to capture or represent an image of a scene under illumination conditions that are different to those under which the image of the scene was originally captured. For instance, if an image of a scene is captured by a camera at sunset which introduces a reddish illuminant, then the camera will record an image with a reddish tinge. The visual system of a human viewing that scene in situ will be adapted to the reddish light source, and will perceive colors of that scene as if they were under a much whiter light source, whereas a human viewing the image of the scene captured by the camera under different illumination conditions will not be adapted to a reddish light source, so the colors will be perceived as unnatural.

Historically, this problem has been ameliorated through the use of chromatic adaptation, and in particular a chromatic adaptation transform, which converts input colors captured under an first illuminant to corresponding output colors under a second illuminant Thus, a chromatic adaptation transform is applied to the tristimulus values $(X',Y',Z')$ of a color captured under a first illuminant in order to predict the corresponding color's tristimulus values $(X'',Y'',Z'')$ under a second illuminant.

Two chromatic adaptation transforms in widespread use are those based on the von Kries and Bradford models. Both use a 3×3 matrix as chromatic adaptation transform of the tristimulus values $(X',Y',Z')$ of the color captured under the first illuminant to predict the corresponding tristimulus values $(X'',Y'',Z'')$ under the second illuminant.

The performance of a chromatic adaptation transform may be determined by taking measurements of the color of a range of surfaces under different illumination conditions and comparing the predictions of the chromatic adaptation transform with the actual measurements taken under the different illumination conditions. It is a desirable property of a chromatic adaptation transform that the average of the differences between the predicted and actual measured colors be as small as possible. For instance, transforms based on the Bradford model outperforms transforms based on the von Kries model in their ability to more accurately predict colors for almost all illuminants and reflecting surfaces. However, transforms based on the Bradford model do not produce the smallest average difference between predicted and actual measured colors.

Furthermore, the transform based on the Bradford model is based in part on testing of human observers in its formulation. When the chromatic adaptation transform is intended to be used to transform colors captured by artificial observers, such as cameras and scanners, the fact that the transform based on the Bradford model is formulated through the testing of human observers, does not make it a natural choice.

SUMMARY

It is an object of the present invention to substantially overcome, or at least ameliorate, one or more disadvantages of existing arrangements.

According to an aspect of the present invention, there is provided a method of estimating final color data from initial color data, said initial color data being observed under an initial illuminant having an initial illuminant spectrum and by an initial observer having initial spectral sensitivity functions, and final color data being observed under a final illuminant having a final illuminant spectrum and by a final observer having final spectral sensitivity functions, said method comprising the steps of:

forming a color transform for transforming said initial color data to said final color data, said color transform being formed by a process of minimization, wherein the contribution of different spectral bands of said illuminant spectra and said spectral sensitivity functions are weighted in said process of minimization based on the contribution made by each spectral band to a predefined function, said predefined function including at least one of said illuminant spectra and at least one of said spectral sensitivity functions; and applying said color transform to said initial color data.

Other aspects of the invention are also disclosed.

BRIEF DESCRIPTION OF THE DRAWINGS

One or more embodiments of the present invention will now be described with reference to the drawings, in which.

DETAILED DESCRIPTION

Figure 1:
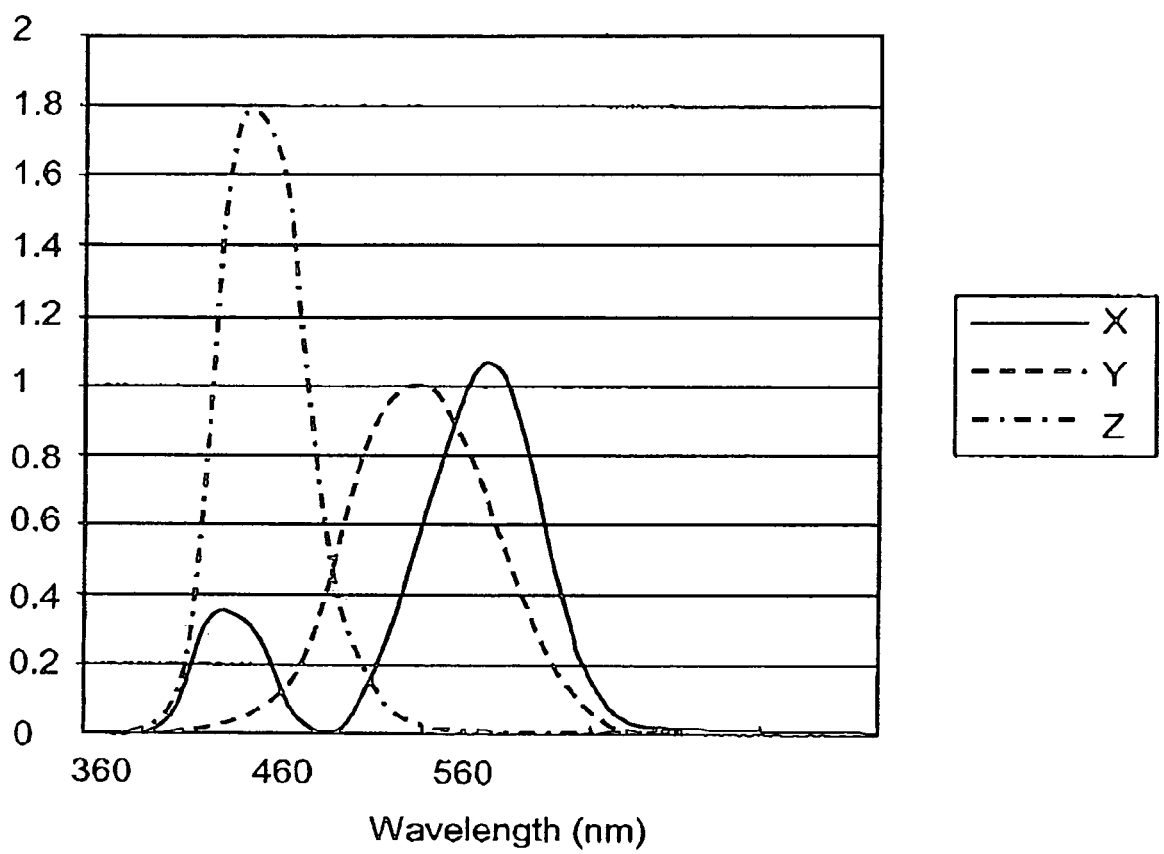
FIG. 1 is a representation of the spectral sensitivity functions of the CIE 1931 2° standard observer.

Where reference is made in any one or more of the accompanying drawings to steps and/or features, which have the same reference numerals, those steps and/or features have for the purposes of this description the same function(s) or operation(s), unless the contrary intention appears.

Some portions of the description which follows are explicitly or implicitly presented in terms of algorithms and symbolic representations of operations on data within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated.

Figure 8:
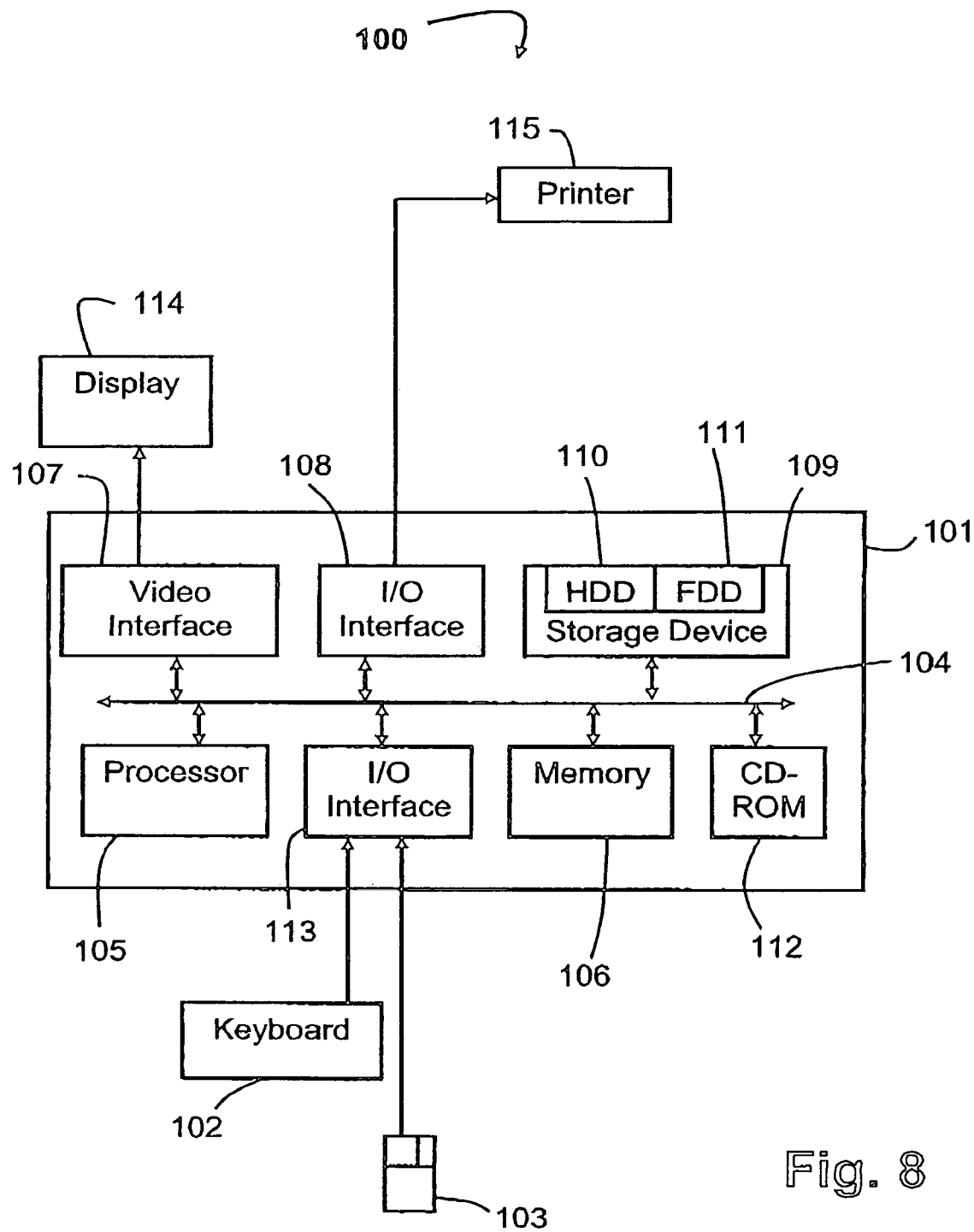
FIG. 8 is a schematic block diagram of a general purpose computer upon which arrangements described can be practiced.

The present specification also discloses apparatus for performing the operations of the methods. Such apparatus may be specially constructed for the required purposes, or may comprise a general purpose computer or other device selectively activated or reconfigured by a computer program stored in the computer. The algorithms and displays presented herein are not inherently related to any particular computer or other apparatus. Various general purpose machines may be used with programs in accordance with the teachings herein. Alternatively, the construction of more specialized apparatus to perform the required method steps may be appropriate. The structure of a conventional general purpose computer is described below with reference to FIG. 8.

In addition, the present invention also implicitly discloses a computer program, in that it would be apparent to the person skilled in the art that the individual steps of the preferred method described herein are to be put into effect by computer code. Such a computer program may be stored on any computer readable medium.

The preferred embodiment of the invention is now described in the context of a color adaptation system that receives as input a set of colors measured under a given initial illuminant, and transforms that set of colors to corresponding colors under a given final illuminant. The color adaptation system would generally act as part of a larger color management system (CMS) which would manage the conversion of colors between different representations and color spaces.

For instance, in computerized proofing applications, an image that is to be printed is displayed on a monitor in a manner that is supposed to accurately reflect the colors of the image as those colors will appear on the printed page. Such a system manages a number of transformations of the image colors to produce an accurate image on the monitor, some of which may require chromatic adaptation due to a change in illuminant. The color adaptation system of the invention forms the part of such a color management system that performs the chromatic adaptation.

Throughout the description it is assumed that colors are represented as XYZ tristimulus values based on the 1931 Commission Internationale de l'Éclairage (CIE) 2° standard observer, though it will be apparent to one skilled in the art that other observers and color specification systems may be used. Methods for converting between various color space values, such as RGB values and XYZ coordinates are well known in the art.

The X, Y, and Z tristimulus values are defined in terms of an illuminant spectrum $I(\lambda)$, the X, Y and Z spectral sensitivity functions, $F^X(\lambda)$, $F^Y(\lambda)$ and $F^Z(\lambda)$, and the spectral reflectance function of the surface being imaged, $R(\lambda)$ through $$X = \int R(\lambda)I(\lambda)F^X(\lambda)d\lambda / \int I(\lambda)F^Y(\lambda)d\lambda$$

$$Y = \int R(\lambda)I(\lambda)F^Y(\lambda)d\lambda / \int I(\lambda)F^Y(\lambda)d\lambda \quad (1)$$

$$Z = \int R(\lambda)I(\lambda)F^Z(\lambda)d\lambda / \int I(\lambda)F^Y(\lambda)d\lambda$$

Figure 2:
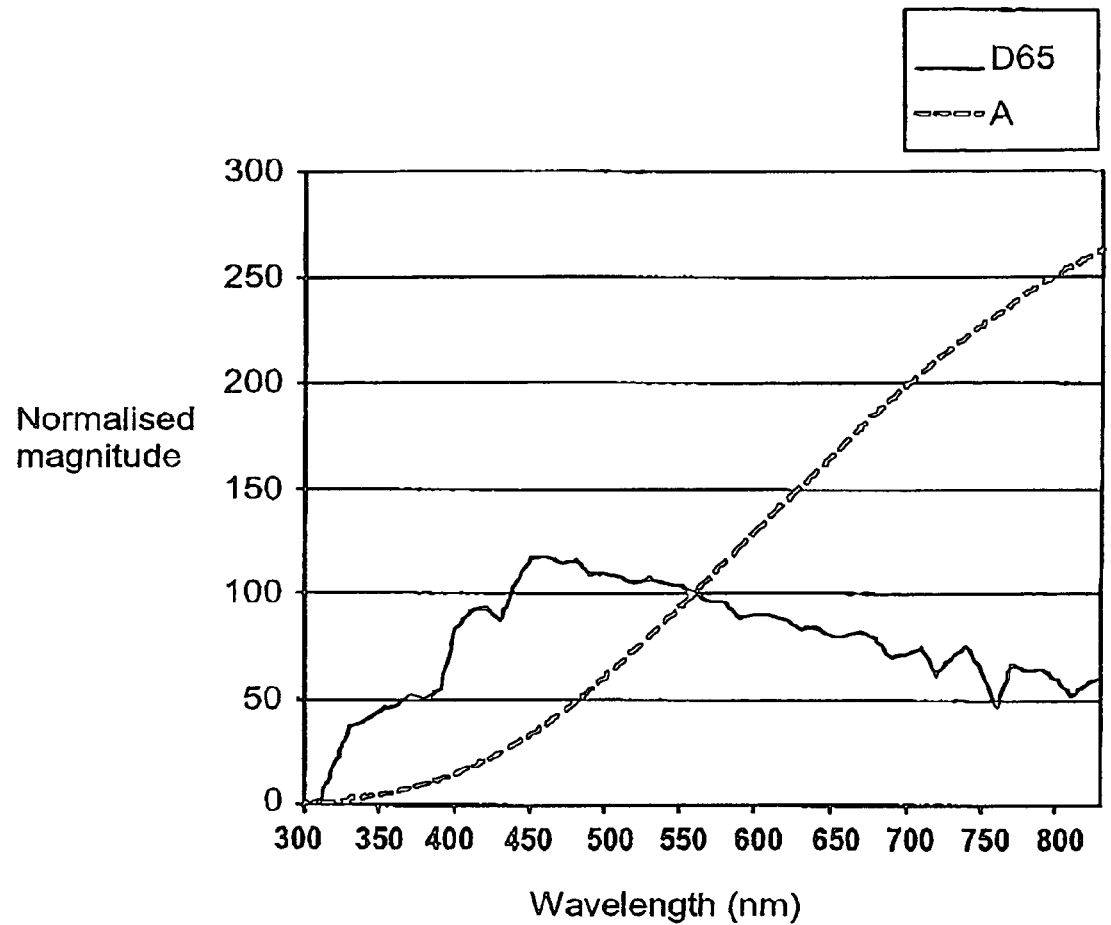
FIG. 2 is a representation of the illuminant spectra of the D65 and A illuminants.

Sample representations of X, Y and Z spectral sensitivity functions $F^X(\lambda)$, $F^Y(\lambda)$ and $F^Z(\lambda)$ are shown in FIG. 1, which are the spectral sensitivity functions as defined for the 1931 CIE 2° standard observer. Representations of the illuminant spectra $I(\lambda)$ of two illuminants, the A illuminant and the D65 illuminant, which are standard illuminants defined by the CIE, are shown in FIG. 2.

Generally, the spectral reflectance function $R(\lambda)$, the illuminant spectrum $I(\lambda)$, and the spectral sensitivity functions $F^X(\lambda)$ $F^Y(\lambda)$ and $F^Z(\lambda)$, are only known at certain evenly spaced sampled wavelengths $\lambda$. For instance, a spectrograph may be used to take measurements at 10 nm wavelength sample spacings from 380 nm to 730 nm. In such a case, the integrals in Equation (1) are replaced by summations over the sample points as follows:

$$X = \sum_i R_i I_i F_i^X / \sum_i I_i F_i^Y \quad (2)$$

$$Y = \sum_i R_i I_i F_i^Y / \sum_i I_i F_i^Y$$

$$Z = \sum_i R_i I_i F_i^Z / \sum_i I_i F_i^Y$$

where $I_i$, $F_i$, and $R_i$ represent the illuminant spectrum, the spectral sensitivity functions and the spectral reflectance function respectively sampled at a wavelength step i. The summations in Equation (2) are defined to be from 1 to M, where M is the number of wavelength samples.

Chromatic adaptation may now be cast as the problem of determining tristimulus values $X^{(2)}, Y^{(2)}$, and $Z^{(2)}$ under a given final illuminant, the final illuminant having an illuminant spectrum $I_i^{(2)}$, from the tristimulus values $X^{(1)}, Y^{(1)}$, and $Z^{(1)}$ under a given initial illuminant, the initial illuminant having an illuminant spectrum $I_i^{(1)}$. The final X, Y and Z spectral sensitivity functions $F_i^{(2)X}$, $F_i^{(2)Y}$, and $F_i^{(2)Z}$ may be different to the initial X, Y and Z spectral sensitivity functions $F_i^{(1)X}$, $F_i^{(1)Y}$, and $F_i^{(1)Z}$, and are specified according to the observer.

The performance of a chromatic adaptation method may be measured by considering how well the predicted colors match the measured colors under the final illuminant. Color comparison may be done using the Euclidean distance between the tristimulus values XYZ, though a more perceptually relevant measurement, $\Delta E^{(Lab)}$ in the Lab color space is generally used.

Let 3×3 matrix A represent a linear chromatic adaptation transform as follows:

$$C^{(2)} = \begin{bmatrix} X^{(2)} \\ Y^{(2)} \\ Z^{(2)} \end{bmatrix} = A \begin{bmatrix} X^{(1)} \\ Y^{(1)} \\ Z^{(1)} \end{bmatrix} = AC^{(1)} \quad (3)$$

with transform matrix A having components $$A = \begin{pmatrix} \alpha_{XX} & \alpha_{XY} & \alpha_{XZ} \\ \alpha_{YX} & \alpha_{YY} & \alpha_{YZ} \\ \alpha_{ZX} & \alpha_{ZY} & \alpha_{ZZ} \end{pmatrix} \quad (4)$$

that minimise the $\Delta E^{(Lab)}$ measurement between the predicted and measured colors, thus minimise:

$$\Delta E^{(Lab)}(AC^{(1)}, C_{measured}^{(2)}). \quad (5)$$

Clearly, this problem is under-constrained in that there are only three tristimulus values X, Y and Z, whereas the surface spectral reflectance function $R_i$ may be arbitrarily complicated. In practice, however, approximations may be made that give reasonably good results. One such approximation that is generally made is that the XYZ values under the second illuminant and spectral sensitivity functions $F_i^{(2)X}$, $F_i^{(2)Y}$, and $F_i^{(2)Z}$ may be determined by a linear transformation of the XYZ values under the first illuminant and spectral sensitivity functions $F_i^{(1)X}$, $F_i^{(1)Y}$, and $F_i^{(1)Z}$.

Figure 3:
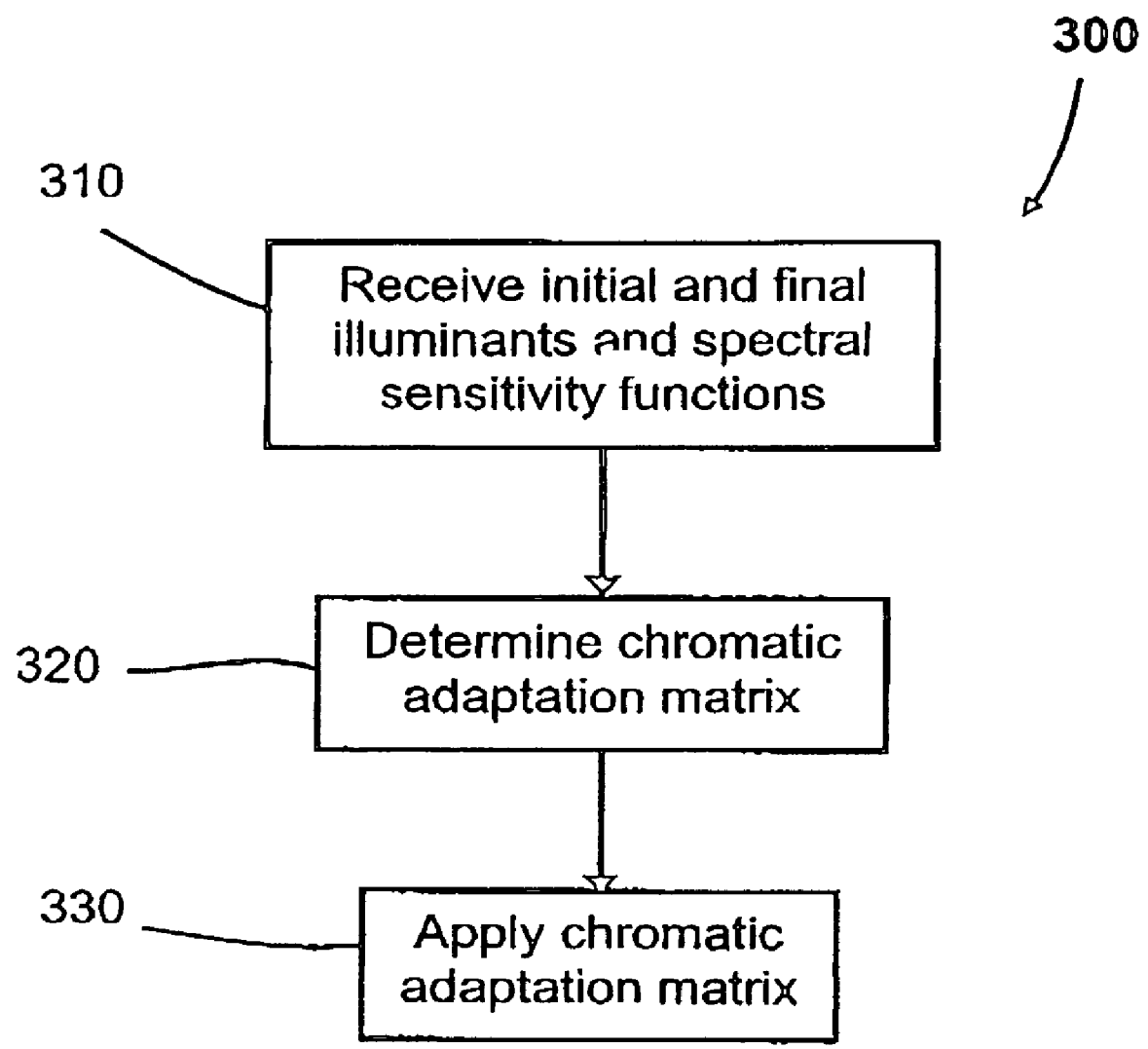
FIG. 3 shows a schematic flow diagram of a method of performing chromatic adaptation according to an embodiment of the current invention.

FIG. 3 shows a schematic flow diagram of a method 300 of performing chromatic adaptation according to an embodiment of the present invention. The method 300 is preferably practiced using a general-purpose computer system 100, such as that shown in FIG. 8 wherein the method 300 may be implemented as software, such as an application program executing within the computer system 100. The software may be stored in a computer readable storage medium, including the storage devices described below, for example. The software is loaded into the computer system 100 from the computer readable storage medium, and then executed by the computer system 100. A computer readable storage medium having such software or computer program recorded on it is a computer program product. The use of the computer program product in the computer preferably effects an advantageous apparatus for performing chromatic adaptation.

The computer system 100 is formed by a computer module 101, input devices such as a keyboard 102 and mouse 103, and output devices including a printer 115 and a display device 114.

The computer module 101 typically includes at least one processor unit 105, and a memory unit 106, for example formed from semiconductor random access memory (RAM) and read only memory (ROM). The module 101 also includes a number of input/output (I/O) interfaces including a video interface 107 that couples to the video display 114, an I/O interface 113 for the keyboard 102 and mouse 103, and an interface 108 for the printer 115. A storage device 109 is provided and typically includes a hard disk drive 110 and a floppy disk drive 111. A CD-ROM drive 112 is typically provided as a non-volatile source of data. The components 105 to 113 of the computer module 101, typically communicate via an interconnected bus 104 and in a maimer which results in a conventional mode of operation of the computer system 100 known to those in the relevant art.

Typically, the application program containing the instructions for performing the method 300 is resident on the hard disk drive 110 and read and controlled in its execution by the processor 105. Intermediate storage of the program may be accomplished using the semiconductor memory 106, possibly in concert with the hard disk drive 110. In some instances, the application program may be supplied to the user encoded on a CD-ROM or floppy disk and read via the corresponding drive 112 or 111. The software can also be loaded into the computer system 100 from other computer readable media. The term "computer readable storage medium" as used herein refers to any storage medium that participates in providing instructions and/or data to the computer system 100 for execution and/or processing. Computer readable transmission media may also be used to provide the instructions or data.

The method 300 of chromatic adaptation may alternatively be implemented in dedicated hardware such as one or more integrated circuits performing the steps or sub-steps of method 300.

Referring again to FIG. 3, the method 300 starts in step 310 where the initial illuminant spectrum $I_i^{(1)}$, the final illuminant spectrum $I_i^{(2)}$, the initial X, Y and Z spectral sensitivity functions $F_i^{(1)X}$, $F_i^{(1)Y}$, and $F_i^{(1)Z}$, and the final X, Y and Z spectral sensitivity functions $F_i^{(2)X}$, $F_i^{(2)Y}$, and $F_i^{(2)Z}$ of the colors between which chromatic adaptation is to be performedare received as input to method 300. As noted above, in the context of a color management system, the color management system is responsible for specifying what the initial and final illuminants are, and for providing the colors to be adapted.

Often, in such a system, the X, Y and Z spectral sensitivity functions $F_i^X$, $F_i^Y$, and $F_i^Z$ for the initial and final conditions are the same. In other contexts the initial and final spectral sensitivity functions $F_i^X$, $F_i^Y$, and $F_i^Z$ may be different such as in the case of color correction of images taken by a digital camera, where the initial spectral sensitivity functions $F_i^{(1)X}$, $F_i^{(1)Y}$, and $F_i^{(1)Z}$ are those of the color channels of the camera used to capture the image, and the final spectral sensitivity functions $F_i^{(2)X}$, $F_i^{(2)Y}$, and $F_i^{(2)Z}$ are those of a human observer. In still other cases, the initial illuminant spectrum $I_i^{(1)}$, the final illuminant spectrum $I_i^{(2)}$, the initial X, Y and Z spectral sensitivity functions $F_i^{(1)X}$, $F_i^{(1)Y}$, and $F_i^{(1)Z}$, and the final X, Y and Z spectral sensitivity functions $F_i^{(2)X}$, $F_i^{(2)Y}$, and $F_i^{(2)Z}$ are specified directly by a user.

Step 320 follows where the chromatic adaptation matrix A (Equation (4)) is determined from the inputs received in step 310. Step 320 is described in more detail below.

Method 300 ends in step 330 where the chromatic adaptation matrix A is applied to the colors $C^{(1)}$ through matrix multiplication and, in particular, through applying Equation (3) to the colors $C^{(1)}$ to determine predicted colors $C^{(2)}$.

Figure 4:
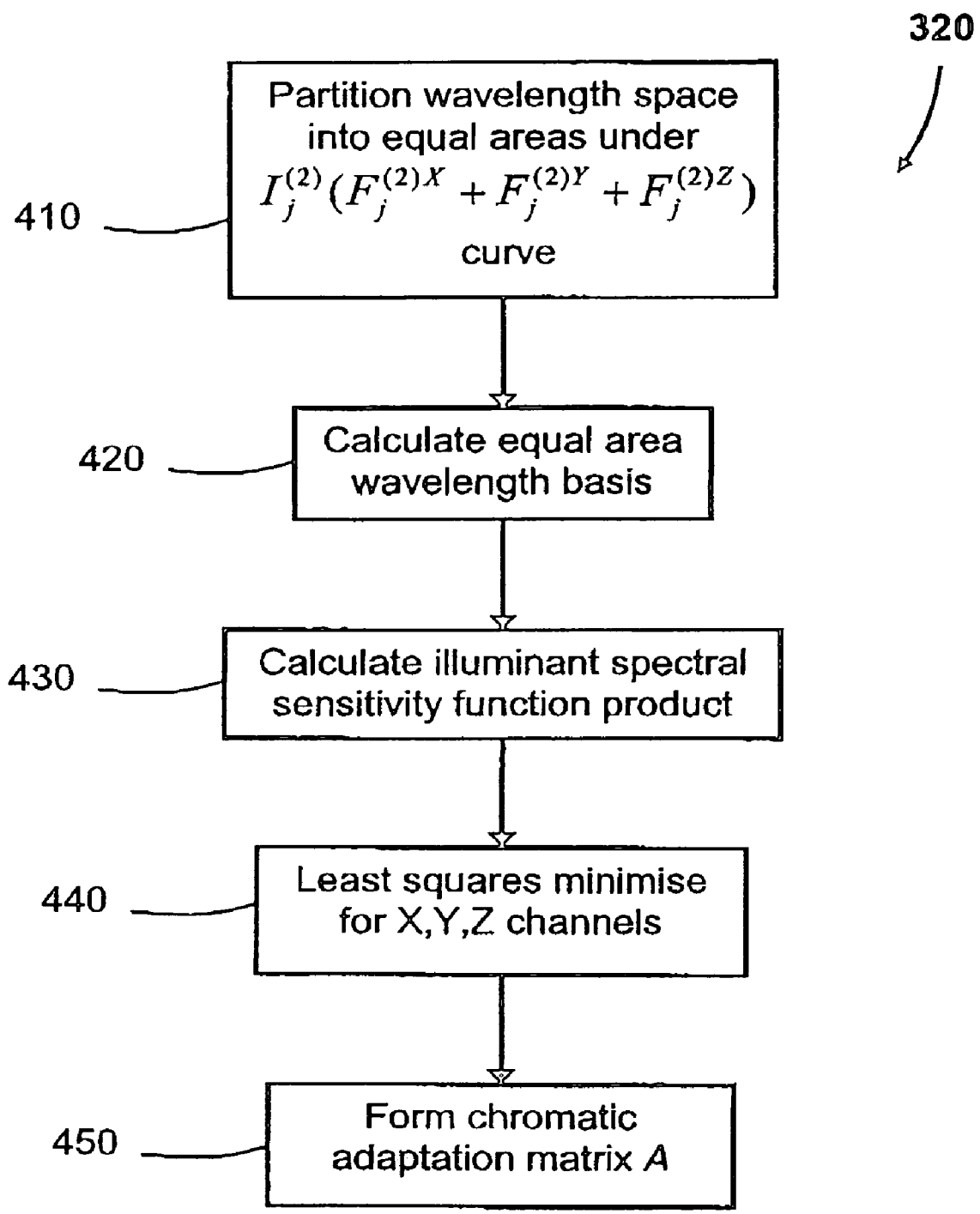
FIG. 4 shows a schematic flow diagram of the sub-steps for determining a chromatic adaptation matrix.

Step 320 in which the chromatic adaptation matrix A is determined is now described in more detail with reference to FIG. 4 where a schematic flow diagram of the sub-steps of step 320 is shown. Step 320 starts in sub-step 410 where the product of the spectrum of the final illuminant $I_i^{(2)}$ with the sum of spectral sensitivity functions $F_i^{(2)X}$, $F_i^{(2)Y}$, and $F_i^{(2)Z}$ is used to partition the wavelength space into regions of equal area under the curve defined by $I_j^{(2)}(F_j^{(2)X}+F_j^{(2)Y}+F_j^{(2)Z})$. In particular, the wavelength range over which the final illuminant spectrum $I_i^{(2)}$ and the spectral sensitivity functions $F_i^{(2)X}$, $F_i^{(2)Y}$, and $F_i^{(2)Z}$ are defined is divided into N segments, by selecting N+1 partition points, $p_j$, for j=1 . . . N+1. The preferred value for N is 14. Let the samples in the wavelength range be represented as integers 0 to M, then each partition point $p_j$ is also represented as a number between 0 and M. The N+1 partition points $p_j$ are selected in such a way that the sum of $I_j^{(2)}(F_j^{(2)X}+F_j^{(2)Y}+F_j^{(2)Z})$ over each segment is equal to 1/N times the sum of $I_j^{(2)}(F_j^{(2)X}+F_j^{(2)Y}+F_j^{(2)Z})$ over the total wavelength range.

Figure 6:
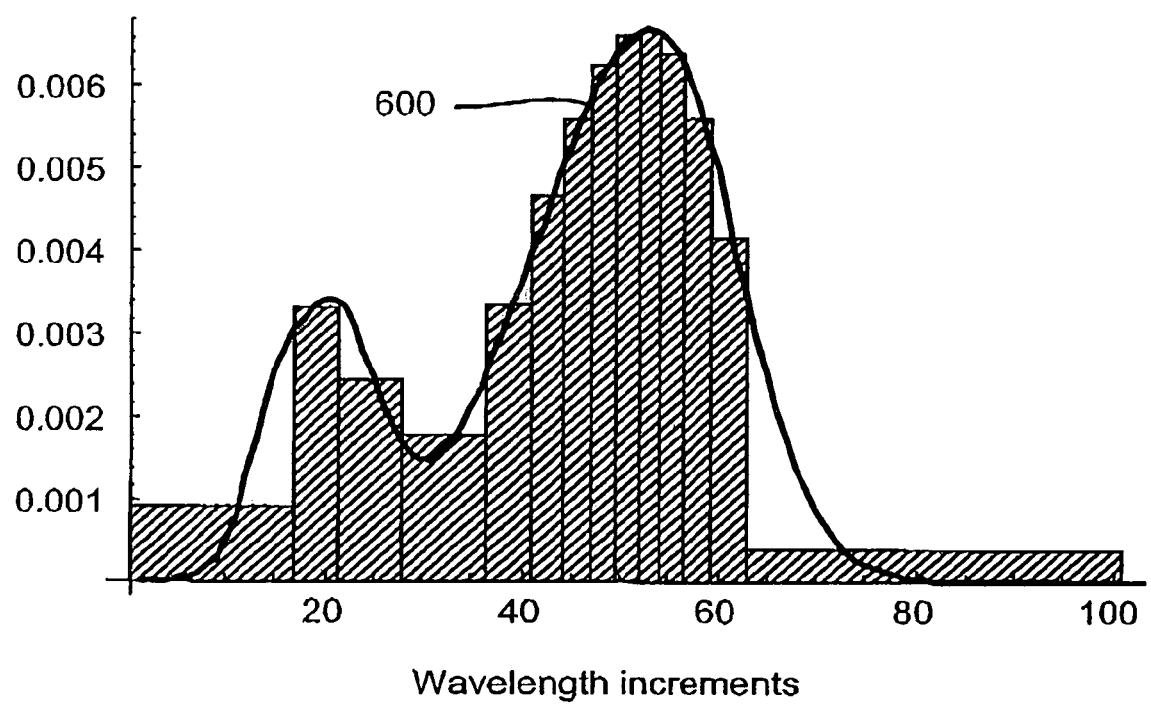
FIG. 6 is an example of the result of the wavelength space partition process.

FIG. 6 shows a curve 600 defined by the function $I_j^{(2)}(F_j^{(2)X}+F_j^{(2)Y}+F_j^{(2)Z})$ for an example illuminant spectrum $I_i^{(2)}$ and spectral sensitivity functions $F_i^{(2)X}$, $F_i^{(2)Y}$, and $F_i^{(2)Z}$. Also shown on FIG. 6 are 14 regions of equal area under the curve. The points on the wavelength axis dividing the regions are the partition points $p_j$.

If the partition points $p_j$ were restricted to lie only on the exact wavelength sample values, then the condition that the area of each region be equal could only be made approximately. However, allowing the partition points $p_j$ to lie in-between wavelength sample values, and using linear interpolation to interpolate values for $I_j^{(2)}(F_j^{(2)X}+F_j^{(2)Y}+F_j^{(2)Z})$ between the wavelength sample values, the condition may be met precisely.

Figure 5:
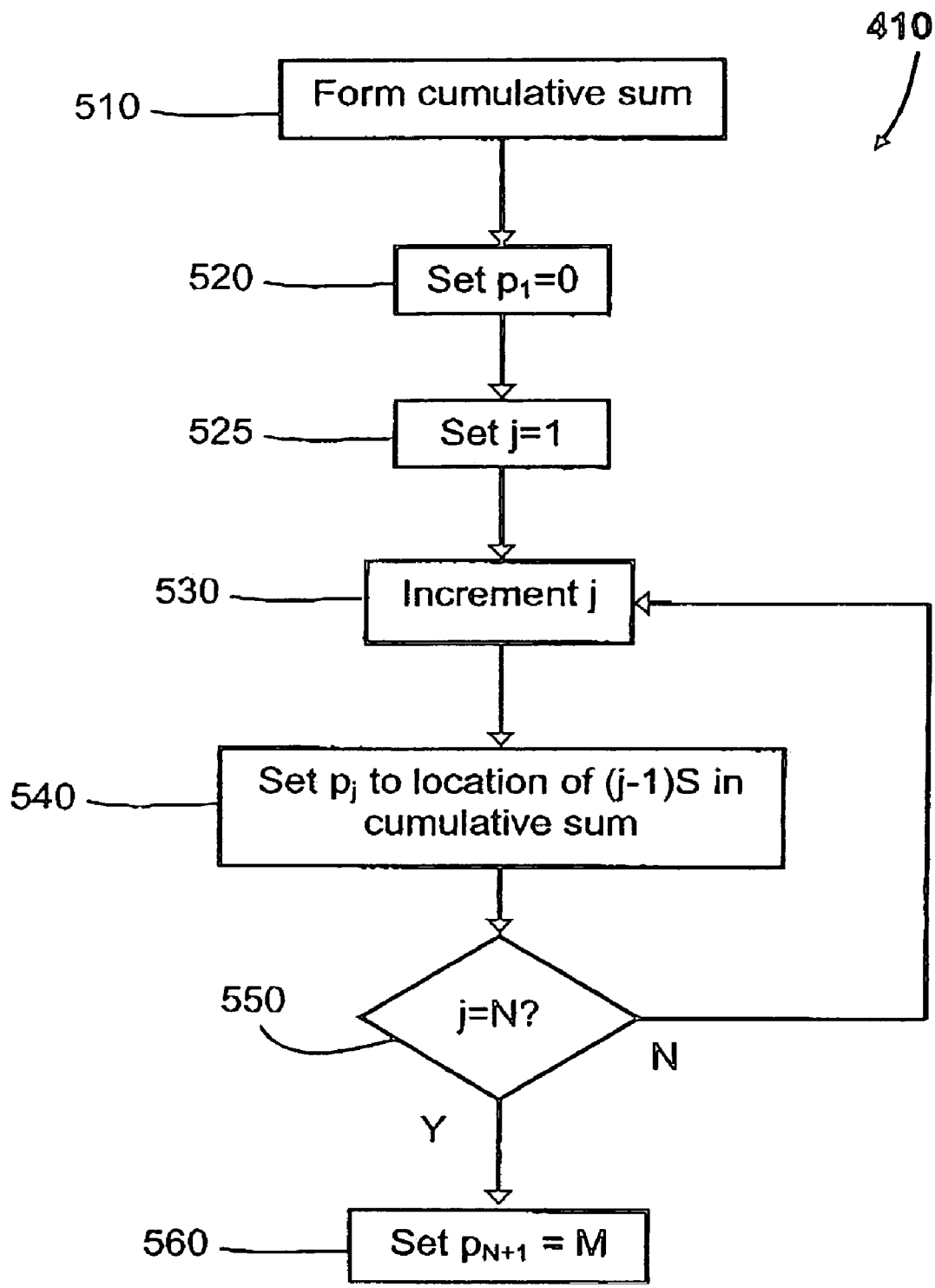
FIG. 5 is a schematic flow diagram of the sub-steps of partitioning the wavelength space.

The selection of the partition points $p_j$ performed in sub-step 410 is now described in more detail with reference to FIG. 5 where a schematic flow diagram is shown of the preferred steps for selecting the partition points $p_j$. Sub-step 410 starts in sub-step 510 where the processor 105 forms a cumulative sum $S_j$, consisting of an M+1 element vector, by summing the values of $I_j^{(2)}(F_j^{(2)X}+F_j^{(2)Y}+F_j^{(2)Z})$. The jth element of the cumulative sum $S_j$ is formed by summing the first to jth element of this expression, i.e.

$$S_0 = 0; \text{ and} \quad (6)$$

$$S_j = \sum_{i=1}^{j} I_i^{(2)}(F_i^{(2)X} + F_i^{(2)Y} + F_i^{(2)Z}) \text{ for } j = 1 \text{ to } M.$$

Let S denote 1/N times the sum of $I_j^{(2)}(F_j^{(2)X}+F_j^{(2)Y}+F_j^{(2)Z})$ over the total spectrum, which may be expressed as:

$$S = \frac{1}{N}\sum_{j=1}^{M} I_j^{(2)}(F_j^{(2)X} + F_j^{(2)Y} + F_j^{(2)Z}) = \frac{1}{N}S_M. \quad (7)$$

In step 520 the first partition point $p_i$ is set to 0, as the start of the first region lies at the first sample point. Sub-step 525 follows where an integer variable j is set to an initial value of 1, followed by sub-step 530 where the processor 105 increments variable j.

In sub-step 540 the location i of the cumulative sum $S_i$ with the value (j−1)S is found. This may be accomplished by searching through the values of the cumulative sums $S_i$ until an index i is found whereby $$S_i < (j-1)S \le S_{i+1} \quad (8)$$

and then setting partition point $p_j$ as:

$$p_j = i + ((j-1)S - S_i)/(S_{i+1} - S_i). \quad (9)$$

Sub-step 550 then determines whether the variable j is equal to N. If the processor 105 determines that the variable j is not yet equal to N, then sub-step 410 returns to sub-step 530 from where sub-steps 530 to 550 are repeated to determine the next partition point $p_j$. If the processor 105 determines that the variable j is equal to N, then the last partition point $p_{N+1}$ is set to M in step 560, as the last partition point $p_{N+1}$ lies on the last wavelength sample value M.

Referring again to FIG. 4, in sub-step 410 described above the wavelength space is partitioned into regions of equal area under the curve defined by $I_j^{(2)}(F_j^{(2)X}+F_j^{(2)Y}+F_j^{(2)Z})$. Other functions may be used for partitioning the wavelength space, such as $I_j^{(1)}(F_j^{(1)X}+F_j^{(1)Y}+F_j^{(1)Z})$, $(I_j^{(1)}+I_j^{(2)})(F_j^{(2)X}+F_j^{(2)Y}+F_j^{(2)Z})$, or $I_j^{(2)}F_j^{(2)Y}$. However, the choice of the function $I_j^{(2)}(F_j^{(2)X}+F_j^{(2)Y}+F_j^{(2)Z})$ performs well in practice as that function guarantees that achromatic XYZ values are transformed to achromatic XYZ values using the resulting chromatic adaptation transform matrix A.

Following the partitioning of the wavelength space in sub-step 410, the locations of the partition points $p_j$ are used in sub-step 420 to calculate an equal area step-wise basis function for the wavelength space. There is one basis function for each segment of the partition determined in step 410. Each basis function may be expressed as a sampled function with M samples. The jth segment of the partition is represented by the jth basis function, the ith sample of which is denoted by $B_i^{(j)}$.

The ith samples of the basis function $B_i^{(j)}$ corresponding to a given partition segment j has a value of 1 if the ith sample lies wholly within the jth segment, 0 if the ith sample is wholly excluded from the jth segment, and some number between 0 and 1 if the ith sample lie on the end of the jth segment. In this last case, the value of the ith sample is the fraction of the sample that lies within the jth partition segment.

As the jth segment of the partition is bounded by partition points $p_j$ and $p_{j+1}$, the ith sample of the jth basis function is specified by:

$$B_i^{(j)} = \begin{cases} 0 & i < \lfloor p_j \rfloor \\ 1 - p_j + \lfloor p_j \rfloor & i = \lfloor p_j \rfloor, \lfloor p_j \rfloor \ne \lfloor p_{j+1} \rfloor \\ 1 & \lfloor p_j \rfloor < i \le \lfloor p_{j+1} \rfloor \\ 1 - \lceil p_{j+1} \rceil + p_{j+1} & i = \lfloor p_{j+1} \rfloor, \lfloor p_j \rfloor \ne \lfloor p_{j+1} \rfloor \\ 0 & i > \lceil p_{j+1} \rceil \\ p_{j+1} - p_j & i = \lfloor p_j \rfloor = \lfloor p_{j+1} \rfloor \end{cases} \quad (10)$$

wherein the function $\lfloor \ \rfloor$ represents the floor function, and the function $\lceil \ \rceil$ represents the ceiling function.

In step 430 the product of the illuminant and response functions, those being $I_i^{(1)}F_i^{(1)X}$, $I_i^{(1)}F_i^{(1)Y}$, $I_i^{(1)}F_i^{(1)Z}$, $I_i^{(2)}F_i^{(2)X}$, $I_i^{(2)}F_i^{(2)Y}$, and $I_i^{(2)}F_i^{(2)Z}$, are weighted by the basis functions $B_i^{(j)}$, and summed over the wavelength partition calculated in step 410 above, to form the projections $K_{j\,(1)X}$, $K_j^{(1)Y}$, $K_j^{(1)Z}$, $K_j^{(2)X}$, $K_j^{(2)Y}$ and $K_j^{(2)Z}$ respectively. Each of the summations produces a vector of N elements, the kth element of which holds the sum of the corresponding product over the spectral range covered by the kth wavelength partition, thus:

$$K_j^{(1)X} = \sum_{i=1}^{M} B_i^{(j)} I_i^{(1)} F_i^{(1)X} \quad (11)$$

$$K_j^{(1)Y} = \sum_{i=1}^{M} B_i^{(j)} I_i^{(1)} F_i^{(1)Y} \quad (12)$$

$$K_j^{(1)Z} = \sum_{i=1}^{M} B_i^{(j)} I_i^{(1)} F_i^{(1)Z} \quad (13)$$

$$K_j^{(2)X} = \sum_{i=1}^{M} B_i^{(j)} I_i^{(2)} F_i^{(2)X} \quad (14)$$

$$K_j^{(2)Y} = \sum_{i=1}^{M} B_i^{(j)} I_i^{(2)} F_i^{(2)Y} \quad (15)$$

$$K_j^{(2)Z} = \sum_{i=1}^{M} B_i^{(j)} I_i^{(2)} F_i^{(2)Z} \quad (16)$$

In sub-step 440, the processor 105 forms a matrix H and then uses the matrix H to produce 3 vectors, $V^X$, $V^Y$, and $V^Z$, each vector $V^X$, $V^Y$, and $V_Z$ having 3 elements which become the rows of the chromatic adaptation matrix A. The matrix H is an N by 3 matrix in which the vectors of the summations produced in step 430 form the columns according to $$H = (K^{(1)X} | K^{(1)Y} | K^{(1)Z}). \quad (17)$$

Two normalisation values are calculated by the processor 105 as:

$$W^{(1)} = \sum_{i=1}^{M} I_i^{(1)} F_i^{(1)Y}, \text{ and} \quad (18)$$

$$W^{(2)} = \sum_{i=1}^{M} I_i^{(2)} F_i^{(2)Y}, \quad (19)$$

and the least squares solutions of the over-constrained linear equations are $$\frac{1}{W^{(1)}}HV^X = \frac{1}{W^{(2)}}K^{(2)X} \quad (20)$$

$$\frac{1}{W^{(1)}}HV^Y = \frac{1}{W^{(2)}}K^{(2)Y} \quad (21)$$

$$\frac{1}{W^{(1)}}HV^Z = \frac{1}{W^{(2)}}K^{(2)Z} \quad (22)$$

using the pseudo-inverse method. In summary, the solution to this problem may be written as $$V^X = \frac{W^{(1)}}{W^{(2)}}(H^T H)^{-1}(H^T K^{(2)X}) \quad (23)$$

$$V^Y = \frac{W^{(1)}}{W^{(2)}}(H^T H)^{-1}(H^T K^{(2)Y}) \quad (24)$$

$$V^Z = \frac{W^{(1)}}{W^{(2)}}(H^T H)^{-1}(H^T K^{(2)Z}), \quad (24)$$

Step 320 ends in sub-step 450 where the three vectors, $V^X$, $V^Y$, and $V^Z$ generated in sub-step 440 are placed in the rows of the chromatic adaptation matrix A, according to $$A = \begin{pmatrix} V_1^X & V_2^X & V_3^X \\ V_1^Y & V_2^Y & V_3^Y \\ V_1^Z & V_2^Z & V_3^Z \end{pmatrix} \quad (25)$$

The fact that method 300 determines an optimal chromatic adaptation matrix A in the linear least squares sense may be demonstrated by considering the following reorganisation of Equations (3) and (4):

$$\begin{pmatrix} X^{(2)} \\ Y^{(2)} \\ Z^{(2)} \end{pmatrix} = \begin{pmatrix} \alpha_{XX} & \alpha_{XY} & \alpha_{XZ} \\ \alpha_{YX} & \alpha_{YY} & \alpha_{YZ} \\ \alpha_{ZX} & \alpha_{ZY} & \alpha_{ZZ} \end{pmatrix} \begin{pmatrix} X^{(1)} \\ Y^{(1)} \\ Z^{(1)} \end{pmatrix} \quad (26)$$

The first row of Equation (26) may be extracted and expanded to:

$$\frac{1}{W^{(2)}} \sum_{j=1}^{M} R_j I_j^{(2)} F_j^{(2)X} = \quad (27)$$

$$\frac{1}{W^{(2)}} \sum_{j=1}^{M} R_j (\alpha_{XX} I_j^{(1)} F_j^{(1)X} + \alpha_{XY} I_j^{(1)} F_j^{(1)Y} + \alpha_{XZ} I_j^{(1)} F_j^{(1)Z})$$

and rearranged to $$0 = \sum_{j=1}^{M} R_j (\alpha_{XX} I_j^{(1)} F_j^{(1)X} / W^{(1)} + \quad (28)$$

$$\alpha_{XY} I_j^{(1)} F_j^{(1)Y} / W^{(1)} + \alpha_{XZ} I_j^{(1)} F_j^{(1)Z} / W^{(1)} - I_j^{(2)} F_j^{(2)X} / W^{(2)})$$

Given that there is no a priori knowledge about the distribution of reflectance $R_j$, finding a least squares solution to the over-constrained problem determined by setting the term in brackets in Equation (28) to zero for all spectral channels will lead to a solution for the values of $\alpha_{XX}$, $\alpha_{XY}$ and $\alpha_{XZ}$. Similarly, solutions can be obtained for the other 6 components of the chromatic adaptation matrix A.

However, matrix A obtained in the manner described in the preceding paragraph will not be optimal, as the least squares solution equally weights all spectral channels regardless of their contribution to the tristimulus values XYZ, when clearly a channel which contributes strongly to the X, Y or Z tristimulus value under illuminant $I_i^{(2)}$ is more important that one that does not contribute.

Hence, introducing a basis function $B_i^{(j)}$ which allows the contribution of different parts of the spectrum to be weighted based on their contribution to the evaluation of the tristimulus values produces a better chromatic adaptation matrix A. Alternative methods that adjust the importance of the various wavelength components in the calculation of the adaptation matrix A could be applied to achieve the result achieved here by partitioning the wavelength space into stepwise pieces that reflect the spectral distributions of the illuminant $I_i$ and spectral sensitivity functions $F^X(\lambda)$, $F^Y(\lambda)$ and $F^Z(\lambda)$. One such method would be using a weighted least squares fitting algorithm where the weighting function is based on some combination of the illuminants $I_i$ and the spectral sensitivity functions $F^X(\lambda)$, $F^Y(\lambda)$ and $F^Z(\lambda)$.

Figure 7:
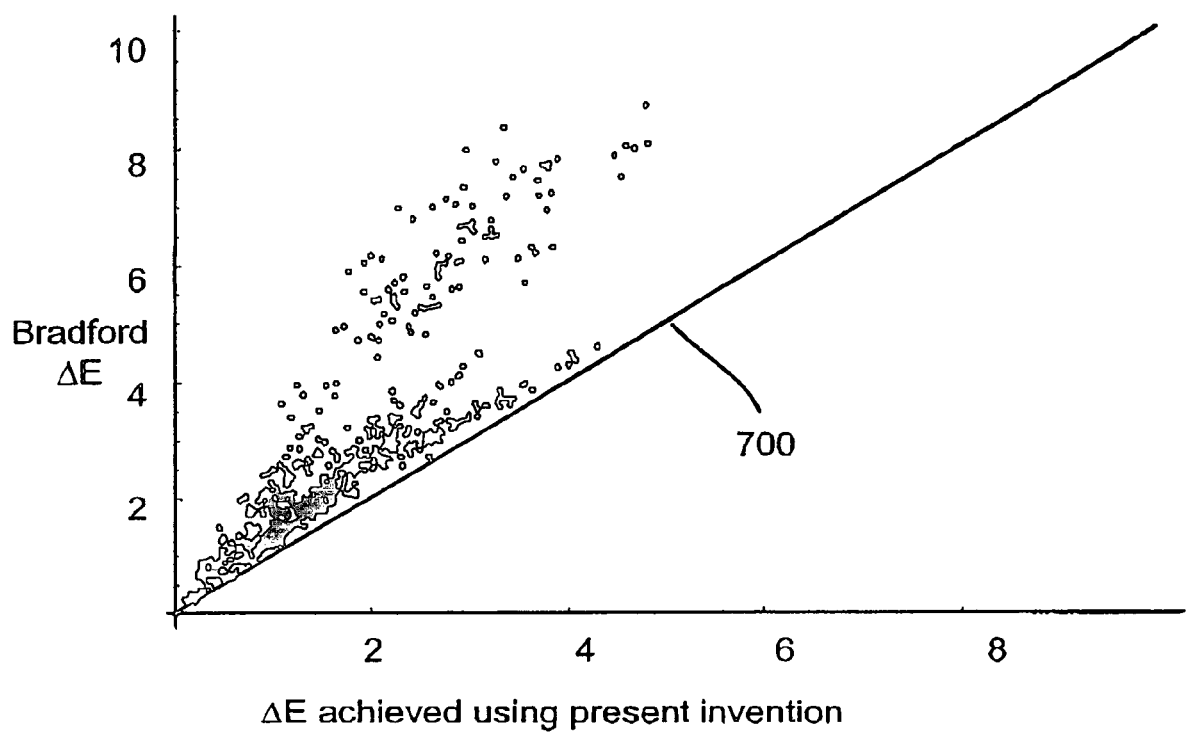
FIG. 7 is a plot comparing the results of the preferred embodiment and a prior art method.

To demonstrate the efficacy of the embodiment described, the mean $\Delta E^{(Lab)}$ error produced in adapting a wide range of spectral reflectances $R_i$ between a wide range of illuminants $I_i$ using both the chromatic adaptation achieved by using method 300, and that obtained by using the Bradford adaptation method, is shown in FIG. 7. In this figure, the horizontal axis shows the mean $\Delta E$ achieved using method 300, and the vertical axis shows the mean $\Delta E$ for the Bradford adaptation method. Each point in the graph represents the mean $\Delta E$ for the adaptation of 1950 different reflectance spectra $R_i$ between two different illuminants $I_i^{(1)}$ and $I_i^{(2)}$. The line of equality 700 for the two methods is also shown. It is noted that all of the data points lie above the line of equality 700, showing that the method 300 outperforms the Bradford adaptation method for every pair-wise combination of the 25 illuminants tested.

A particular advantage of the approach to chromatic adaptation used in method 300 is that it is based entirely on the spectral properties of the illuminants $I_i$ and spectral sensitivity functions $F^X(\lambda)$, $F^Y(\lambda)$ and $F^Z(\lambda)$. As a result method 300 may be applied to the adaptation of colors between human perceptual based color spaces and artificial sensor based color spaces, such as those generated by a digital camera. Furthermore, though this description has been based on the common situation of there being three spectral sensitivity functions $F^X(\lambda)$, $F^Y(\lambda)$ and $F^Z(\lambda)$, method 300 is equally applicable to color systems with more than three spectral sensitivity functions. For instance, method 300 may be used to adapt colors generated on a camera with more than three color sensor types to a human vision based color space by including an extra column in matrix H representing the data from the $4^{th}$ sensor type and thereby generating a 3×4 color adaptation matrix A.

The foregoing describes only some embodiments of the present invention, and modifications and/or changes can be made thereto without departing from the scope and spirit of the invention, the embodiments being illustrative and not restrictive.

I claim:

1. A method of estimating final color data from initial color data, said initial color data being observed under an initial illuminant having an initial illuminant spectrum and by an initial observer having initial spectral sensitivity functions, and said final color data being observed under a final illuminant having a final illuminant spectrum and by a final observer having final spectral sensitivity functions, said method comprising:

using a processor to perform the steps of:

forming a set of weighted spectral bands of at least one of said illuminant spectra based on the contribution made by each spectral band to a predefined function, said predefined function including at least one of said illuminant spectra and at least one of said spectral sensitivity functions; and forming a color transforming said initial color data to said final color data, said color transform being formed by a process of minimization comprising using the formed set of weighted spectral bands to minimize the residual error for color data predicted using said color transform; and applying said formed color transform to said initial color data.

2. The method as claimed in claim 1, wherein said process of minimization is least square minimization.

3. The method as claimed in claim 1 wherein said weighting comprises the sub-steps of:

partitioning the spectral space into said spectral bands, wherein the areas under said predefined function for each spectral band are substantially equal; and weighting the products of said illuminant spectra and corresponding spectral sensitivity functions with a basis function indicative of the contribution made by each spectral band to said predefined function.

4. The method as claimed in claim 1 wherein said predefined functions is $I_j^{(2)}(F_j^{(2)X}+F_j^{(2)Y}+F_j^{(2)Z})$, wherein $I_j^{(2)}$ is said final illuminant spectrum, and $F_j^{(2)X}, F_j^{(2)Y}$, and $F_j^{(2)Z}$ are said spectral sensitivity functions for Y, Y and Z channels in the XYZ color space.

5. Computer apparatus for estimating final color data from initial color data, said initial color data being observed under an initial illuminant having an initial illuminant spectrum and by an initial observer having initial spectral sensitivity functions, and said final color data being observed under a final illuminant having a final illuminant spectrum and by a final observer having final spectral sensitivity functions, said apparatus comprising:

means for forming a set of weighted spectral bands of at least one of said illuminant spectra based on the contribution made by each spectral band to a predefined function, said predefined function including at least one of said illuminant spectra and at least one of said spectral sensitivity functions;

means for forming a color transform for transforming said initial color data to said final color data, said color transform being formed by a process of minimization comprising using the formed set of weighted spectral bands to minimize the residual error for color data predicted using said color transform; and means for applying said color transform to said initial color data.

6. A computer readable storage medium having computer readable code recorded thereon, the code being executable by a computer for estimating final color data from initial color data, said initial color data being observed under an initial illuminant having an initial illuminant spectrum and by an initial observer having initial spectral sensitivity functions, and final color data being observed under a final illuminant having a final illuminant spectrum and by a final observer having final spectral sensitivity functions, said code comprising:

code for forming a set of weighted spectral bands of at least one of said illuminant spectra based on the contribution made by each spectral band to a predefined function, said predefined function including at least one of said illuminant spectra and at least one of said spectral sensitivity functions;

code for forming a color transform for transforming said initial color data to said final color data, said color transform being formed by a process of minimization comprising using the formed set of weighted spectral bands to minimize the residual error for color data predicted using said color transform; and code for applying said formed color transform to said initial color data.

* * * * *